(12) United States Patent
Brockett et al.

(10) Patent No.: US 9,805,925 B1
(45) Date of Patent: Oct. 31, 2017

(54) ELECTRODELESS HIGH INTENSITY DISCHARGE LAMP WITH FIELD SUPPRESSION PROBES

(71) Applicant: SPL Industries USA, Inc., Encino, CA (US)

(72) Inventors: Timothy J. Brockett, Malibu, CA (US); Gregg A. Hollingsworth, Tempe, AZ (US); Mehran Matloubian, Encino, CA (US)

(73) Assignee: SPL INDUSTRIES USA, INC., Encino, CA (US)

( * ) Notice: Subject to any disclaimer, the term of this patent is extended or adjusted under 35 U.S.C. 154(b) by 0 days.

(21) Appl. No.: 15/270,252

(22) Filed: Sep. 20, 2016

(51) Int. Cl.
*H01J 65/04* (2006.01)
*H01J 61/30* (2006.01)
*H05B 41/24* (2006.01)

(52) U.S. Cl.
CPC .......... *H01J 65/042* (2013.01); *H01J 61/302* (2013.01); *H05B 41/24* (2013.01)

(58) Field of Classification Search
CPC .... Y02B 20/22; H05B 41/2806; H05B 41/24; H05B 41/382; H05B 6/6414; H05B 6/80; H01J 65/042; H01J 65/044; H01J 65/04; H01J 61/302; H03F 1/30; H03F 1/32; H03F 3/602; H05K 1/142; H05K 1/144
See application file for complete search history.

(56) References Cited

U.S. PATENT DOCUMENTS

| | | | | |
|---|---|---|---|---|
| 5,598,059 A * | 1/1997 | Sun | ....................... | C09K 11/574 |
| | | | | 313/503 |
| 6,922,021 B2 * | 7/2005 | Espiau | ................... | H01J 61/025 |
| | | | | 315/111.41 |
| 7,830,092 B2 * | 11/2010 | Espiau | ................... | H01J 65/042 |
| | | | | 315/248 |
| 2007/0085487 A1 * | 4/2007 | Kuennen | .................... | A61L 2/10 |
| | | | | 315/209 R |
| 2014/0001977 A1 * | 1/2014 | Zacharchuk | ........ | H04L 12/2816 |
| | | | | 315/291 |

* cited by examiner

*Primary Examiner* — Monica C King
(74) *Attorney, Agent, or Firm* — Richard T. Ogawa; Ogawa P.C.

(57) ABSTRACT

In electrodeless HID lamps the radio frequency (RF) source is separated from a lamp housing in which vessel containing plasma arc is mounted. This lamp housing is usually designed to maximize the amount of RF energy incident on the plasma arc. The plasma arc, however, cannot convert the entire amount of incident RF energy into light and a portion instead is released as propagating radiation or remains localized RF electromagnetic fields in the vicinity of lamp. In this invention, we introduce field suppression probes: Small, configurable structures that are made of conductive materials that mount directly to the lamp housing or alternately the lamp fixture that is able to suppress unused RF energy that is emanated from the lamp housing or plasma. These probes, when configured with the lamp, can substantially suppress the unused RF energy and prevent EMI emissions and reduce RF feedback that can adversely affect the lamp.

32 Claims, 12 Drawing Sheets

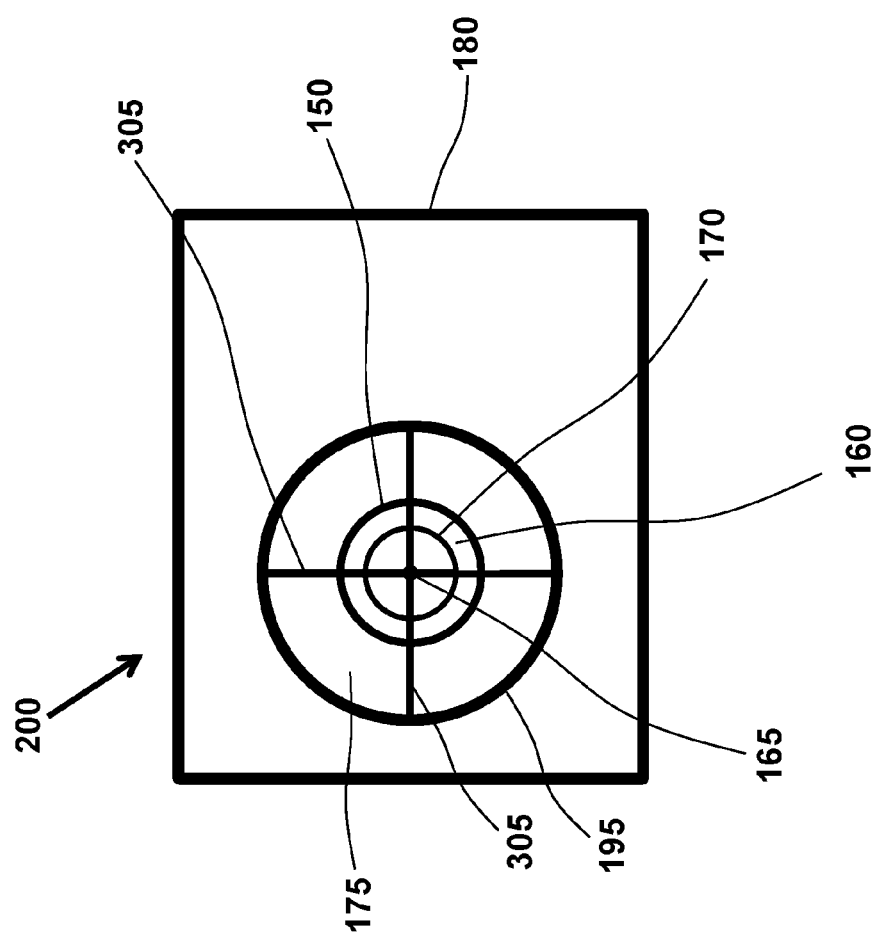

ELECTRODELESS HIGH INTENSITY DISCHARGE LAMP WITH FIELD SUPPRESSION PROBES

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to devices and methods for generating light with electrodeless high intensity discharge (HID) lamps. More particularly, the present invention provides high intensity discharge lamps driven by a radio-frequency source without the use of electrodes inside a gas-filled vessel (bulb) and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, ultraviolet (UV) water treatment, UV curing, any combination of these, and the like.

High intensity discharge lamps provide extremely bright and broad spectrum light source. The typical conventional electroded HID manufactured today contains a bulb with a mixture of gas and metal halides that are excited to form a plasma using a high current passed through closely-spaced electrodes. This arrangement, however, suffers from deterioration of the electrodes over time, and therefore a bulb with limited lifetime.

Electrodeless HID lamps driven by radio frequency (RF) sources have been proposed in the prior art. In all embodiments, the RF source is separated from a lamp module or housing in which the bulb is mounted and configured. This lamp housing is usually designed and configured to maximize the amount of RF energy incident on the bulb. This energy excites (i.e. heats) the gas and materials in the bulb to create an intense plasma that converts the RF energy into infrared, visible, and UV light. In all cases, however, a portion of the provided RF energy cannot reach the bulb or is not absorbed by the plasma and instead is released as propagating wave radiation or remains localized as non-propagating RF electromagnetic fields in the vicinity of lamp housing.

This unused energy can be troublesome. Localized fields can create problems when the lamp engine is placed in a fixture as the structural components, such as reflectors and metal covers, can interact with the fields and create feedback with the RF source. Such feedback can interfere with sensors and components in the RF source causing lamp malfunction and failure. Radiated energy manifests as electromagnetic interference (EMI) in nearby electronic and wireless devices. These EMI emissions can be disruptive and often are regulated by governmental bodies such as the Federal Communications Commission (FCC).

Clearly, management of such unused energy is an important aspect of lamp operation. In the following invention, we introduce field suppression probes that capture and suppress this unused energy, preventing both feedback issues and radiating emissions. Moreover, the probes also improve confinement of the energy to help increase transfer of energy to the plasma.

BRIEF SUMMARY OF THE INVENTION

In most embodiments of an electrodeless lamp, an RF source provides energy that is delivered to a lamp module. In general, the lamp module is designed to effectively deliver RF energy from the input of the lamp module to the bulb. This is done in several ways. For example, some configurations include a bulb or a sealed recess within a dielectric body forming a waveguide that propagates the energy to the bulb and heats the plasma resistively. Another example uses a dielectric cavity with the bulb recessed within to capture the RF fields and couple to the plasma.

More recent embodiments use an air cavity that use grounded elements to inductively couple energy to the bulb or use a specialized wave-launcher module to accept and transfer energy to the bulb. In all of these embodiments, however, a portion of delivered energy is not transferred or dissipated in the bulb. This unused energy is considered loss in the system and reduces the efficacy of the lamp. Moreover, this unused energy can also cause other issues including introducing interference both in the system itself and for any nearby electronic or wireless devices.

The unused energy comes in two forms: Localized, non-propagating RF electromagnetic fields that remain close to the lamp module, and propagating radiative fields that travel away from the lamp and to the surrounding area. The former can be troublesome for the lamp system while the latter can be troublesome for electronic and wireless devices that are near the lamp and suppression of these fields is an important aspect of lamp operation. Furthermore, if this energy could be captured and directed into the bulb, more energy could be converted into light and improve lamp efficacy.

In this invention, we present solution to these issues by introducing field suppression probes to both suppress and redirect the unused energy of an electrodeless lamp. Using these simple and unique structures, it is possible to prevent both electromagnetic interference that can affect the lamp engine and nearby electronics as well as improve the lamp's efficacy.

An embodiment of field suppression probes would include: A lamp engine comprising of an RF driver (RF source, RF amplifier, and supporting electronics), lamp housing, and bulb assembly or vessel assembly (an assembly of one or more conductive or non-conductive sections that a bulb or bulb-like vessel is mounted to); one or more conductive elements (probes) mounted to or integrated with the lamp housing, situated in the vicinity of the bulb or vessel, and configured to maximize the suppression and capture of the unused local and propagating fields and minimize the amount of blockage of light. The probes must be made of electrically conductive material and be conductively attached to the lamp housing or other electrically conductive structure that is conductively attached to the lamp housing. The probes can be situated close to the bulb or vessel assembly or be integrated with the bulb or vessel assembly as long as the probe configuration does not electrically ground the electromagnetic fields. The probes can be of any shape or size, but in general, should not be shaped or configured so that it would block a substantial amount of light emanating from the bulb or vessel.

The field suppression probes accomplish certain things that benefit the operation of the lamp. The presence of the conductive elements attracts electromagnetic fields by providing a field attachment point and a path to the ground potential of the lamp housing. This forces the electromagnetic fields to be confined near the probes and allows one to direct the fields to a desired area near the lamp housing (e.g. by the bulb). This prevents much of the energy that would otherwise propagate away from the lamp and suppresses the influence of surrounding structures on the local fields and the operation of the lamp. Both would prevent electromagnetic interference for the RF driver and other nearby electronic and wireless devices. An additional benefit is that by maximizing the confinement of the fields near the bulb, energy that would otherwise not be available can be coupled into the bulb or vessel and converted to light by the plasma, increasing the overall light output of the lamp.

The present invention achieves these benefits and others in the context of known process technology. However, a further understanding of the nature and advantages of the present invention may be realized by reference to the attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

FIG. 2B is a drawing of the top view of the embodiment shown in FIG. 2A.

DETAILED DESCRIPTION OF THE INVENTION

Figure 1A:
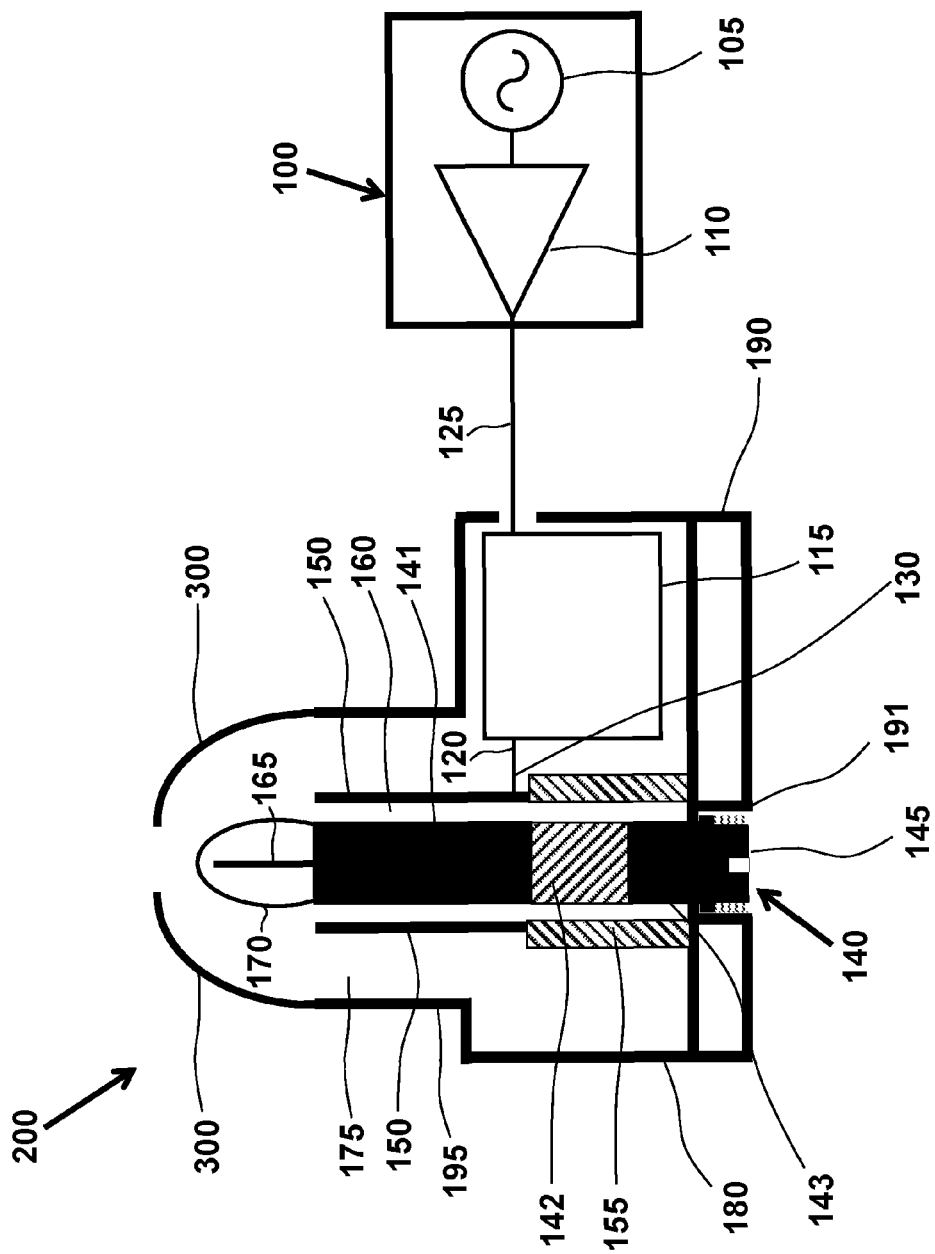
FIG. 1A is a drawing of one embodiment of this invention showing the field suppression probes integrated with the lamp housing that features a wave-launcher module.

The present invention is directed to devices and methods for generating light with electrodeless high intensity discharge (HID) lamps. More particularly, the present invention provides high intensity discharge lamps driven by a radio-frequency source without the use of electrodes inside a gas-filled vessel (bulb) and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, UV water treatment, UV curing, any combination of these, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

In general, electrodeless lamps usually comprise of two or more parts. Firstly, an RF source with an RF amplifier is used to provide the RF energy required to power the lamp. They are usually combined into an RF driver module that usually also includes other electronics, such as microcontroller units and sensors, that allow for automatic control of the lamp during operation. A second part, a lamp housing and other supporting structures and/or circuits, connected to the RF driver, is used to accept and transfer the RF energy from the driver to a vessel that can maintain a plasma arc within. The lamp module both provides a mechanical structure to mount and configure the vessel and also to direct the RF electromagnetic fields to couple to the vessel effectively.

The vessel assembly is comprised of a light-transmitting vessel, and one or more electrically conductive or non-conductive sections that provide the ability to mount to the lamp housing and transfer heat away from the vessel. The vessel is comprised of a quartz or translucent/semi-transparent ceramic vessel filled with an inert gas, such as argon or xenon and a combination of one or more metals and metal halides such as mercury, sodium, dysprosium, sulfur, indium bromide, scandium bromide, thallium iodide, holmium bromide, cesium iodide or other similar materials. The vessel is attached using a high temperature epoxy or slurry inside of a hole in one section of the vessel assembly such that the majority of the vessel and the arc are still exposed.

Most of the prior art concentrates on the functionality of the lamp housing as it is its responsibility to transfer the RF energy into the bulb where the light is generated. Some embodiments include a metal halide fill encased either in a vessel or a sealed recess within a dielectric body forming a waveguide, with RF energy being provided by a source such as a magnetron or solid-state RF source and introduced into the waveguide and heating the plasma resistively. Another example is provided by U.S. Pat. No. 6,737,809 B2, which shows a different arrangement that has limitations. This patent shows an electrodeless bulb and a dielectric cavity forming a part of a resonant RF circuit with an RF amplifier to provide excitation. In another approach disclosed in U.S. Pat. Nos. 8,283,866 and 8,294,368 an air cavity resonator with grounded coupling elements is used to provide advantages over dielectric waveguide/resonator approaches. The air cavity resonator eliminates the need for costly dielectric material and the bulb is substantially more exposed, allowing more light to be released. In a more recent embodiment, the lamp module uses a wave-launcher module to accept and transfer the RF energy to the bulb-like vessel. This approach allows the operating frequency of the lamp to be independent of the dimensions of the lamp housing. This feature allows for more flexibility in the design of the RF driver reducing cost and increasing lamp performance.

In most embodiments of an electrodeless lamp, there is a portion of RF energy that is not utilized by the plasma arc in the vessel. This energy is unused because of the physical properties of the plasma, which can reject or shield some RF energy, forcing the energy to dissipate elsewhere. Additionally, the plasma arc can re-radiate RF energy that was absorbed and not converted to light. The majority of this energy is dissipated through two mechanisms: Radiated emissions and localized fields that dissipate into conductive portions of the lamp housing or lamp fixture. Both are counterproductive to the operation and performance of the lamp system. Radiated emissions manifest as EMI and can affect electronic and wireless devices near the lamp fixture. These emissions must be mitigated by the use of techniques that contain or absorb RF energy and must remain below field levels that are determined and enforced by governmental bodies such as the FCC. Radiative emission mitigation is usually accomplished by the lamp fixtures which feature parts that reduce RF energy, but often these parts also block light, reducing light output and efficacy. Furthermore, localized RF fields, although not propagating, can interact with nearby metal structures, especially those that are part of the lamp fixture (such as reflectors, metal enclosures, mounting structures, etc.). These interactions can cause feedback into the RF driver, causing distortion and malfunction in the RF driver sensors and components. These effects can directly cause lamp malfunction or failure. Plainly, a technique to prevent these potential issues is paramount to a well-functioning lamp engine and fixture.

In this invention, we introduce field suppression probes: Small, configurable structures that are made of electrically conductive materials that mount directly to the lamp housing or alternately the lamp fixture that is able to confine and suppress unused RF energy that is emanated from the lamp housing or plasma. The probes, which have at least one end electrically attached to the lamp housing or fixture, act as a path to the ground potential (which the lamp housing and fixture are fixed to). This in turn attracts the RF electromagnetic fields to attach to the probes, acting to confine and suppress fields from radiating away or interacting with other structures. These structures are typically configured near the bulb or in the volume where the highest fields are since they are most effective near the source of the RF leakage. Moreover, the probes are shaped and configured so to allow minimal light blockage, as a result, the probes are in general small and thin.

In a specific embodiment, a field suppression probe is a thin wire made of an electrically conductive material, such as a metal, that has a typical diameter of 1 mm. It has at least one end or portion electrically attached to the lamp housing or a structure that is electrically attached to the lamp housing. It can partially be integrated with the vessel assembly as long as it configured to maintain the electric field potential that supports the RF electromagnetic fields. The length of the wire can vary and be as long as practically possible, however, the closer the wire is to the plasma arc, the better the energy suppression is achieved. Thus, a length that is similar to the size of the vessel (common electrodeless bulb/vessel dimensions are 20 mm to 40 mm in length and from 6 mm to 20 mm in width (or diameter)) is more likely to be effective.

Although typical embodiments use a wire, the probe design is not limited to wires. The shape can be arbitrary and can include, but not limited by, fins, sheets, circular, arches, rectangular, triangular, or other shapes. It is also possible to attach a plurality of probes to one another, and configure them to improve the field suppression. Such multi-probe configurations can include, but is not limited by, ring structures, mesh structures, loop structures, etc. The probes, however, should be designed so that is avoids blocking a substantial amount of light. As with the wire, the length (or height) of the probe is similar in size to the bulb or vessel. The probe must be made of electrically conductive material and have at least one connection to the lamp housing or structure that is attached to the lamp housing.

As mentioned before, the field suppression probes provide a path to the ground potential for unused RF fields to attach to. In the presence of these probes, the unused fields, which includes both propagating and localized fields, are suppressed and confined closer to the leakage of the RF energy. There are several benefits to this. Firstly, the overall amount of propagating RF energy is reduced substantially, reducing the EMI field strength away from the lamp. Some configurations of field suppression probes can drop the amount of EMI by 15 dB of power (more than 30 times lower) than lamps without field-suppression probes. Secondly, the confinement of the localized fields substantially reduces the interaction of the fields with structures in the local environment. Fixture components, such as reflectors or mounting structures, are usually placed in the vicinity of or even mounted to the lamp housing. In absence of the field suppression probe, the structures, which are usually metallic, redistributes the localized fields. A potential consequence of this is RF feedback, in which the RF fields in the lamp system is phased shifted and changes the readings on the RF sensors or places undesired voltages on critical components in the RF driver. These effects can directly cause lamp malfunction and failure and can be avoided when field suppression probes are present. Finally, a third benefit is that by confining the energy closer to the plasma arc, the RF energy that would escape or be unused by the plasma arc when the field suppression probes were not present, has the potential of being utilized by the plasma arc due to the increased RF fields in the vicinity. This can increase coupling into the plasma arc and increase light output, improving the lamp efficacy.

Specific embodiments are described below:

FIG. 1A is a drawing of an embodiment of this invention. A lamp 200 consists of the lamp housing 180, made from an electrically conductive material such as aluminum, and has an aperture region 195 and a bottom plate 190. The field suppression probes 300 made from an electrically conductive material are electrically connected to top edge of the aperture region. The field suppression probes serve to lower the amount of radiated and reactive RF electromagnetic energy from the top of the aperture region or directly by vessel 170 and plasma arc 165. The lamp housing receives the vessel assembly 140 through a hole 191 in the bottom plate 190. The vessel assembly 140 consists of several components including a top portion 141 and bottom portion 143 made from an electrically conductive material such as aluminum and a middle portion 142 made from an electrically non-conductive material such as a dielectric or ceramic (such as alumina). The top portion 141 of the vessel assembly has a hole at the top to receive the bulb 170 which is attached to it using a high temperature epoxy or slurry. The plasma arc 165 is substantially visible and it is not wholly surrounded by the vessel assembly or the lamp housing. The bottom portion of the vessel assembly 143 has a section with screw threads 145 that can be used to attach the vessel assembly to the lamp housing. The vessel assembly is designed such that the vessel is electrically isolated from the lamp housing which is at ground potential. The vessel can be made from quartz or from a transparent/translucent dielectric or ceramic material. It is filled with an inert gas such as argon or xenon and a combination of one or more metals and metal halides such as mercury, sodium, dysprosium, sulfur, indium bromide, scandium bromide, thallium iodide, holmium bromide, cesium iodide or other similar materials. The RF source 100 consists of an RF oscillator 105 and an RF amplifier 110 and is connected to the wave-launcher module 115 through wire 125. The wave-launcher module uses the RF energy from the RF amplifier to transmit it through a wire 120 and it is connected 130 to the internal conductive member 150. The internal conductive member transmits the RF energy across the gap 175 it forms with the aperture of the lamp housing creating high electric fields that ionizes the gas in the vessel resulting in melting and vaporizing of the metal halides into a plasma arc which causes emission of intense infrared, visible, and UV light. The internal conductive member is electrically isolated from the lamp housing using a non-conductive dielectric material 155. There is also a small air gap 160 to separate the internal conductive member from the vessel assembly to make removal and replacement of the vessel assembly easier. The operating frequency of the lamp module is substantially independent of the dimensions of the lamp housing and it is primarily determined by the structure or values of the components used in the wave-launcher. The lamp housing can be any shape, such as rectangular or circular, without impacting the operation of the lamp.

Figure 1B:
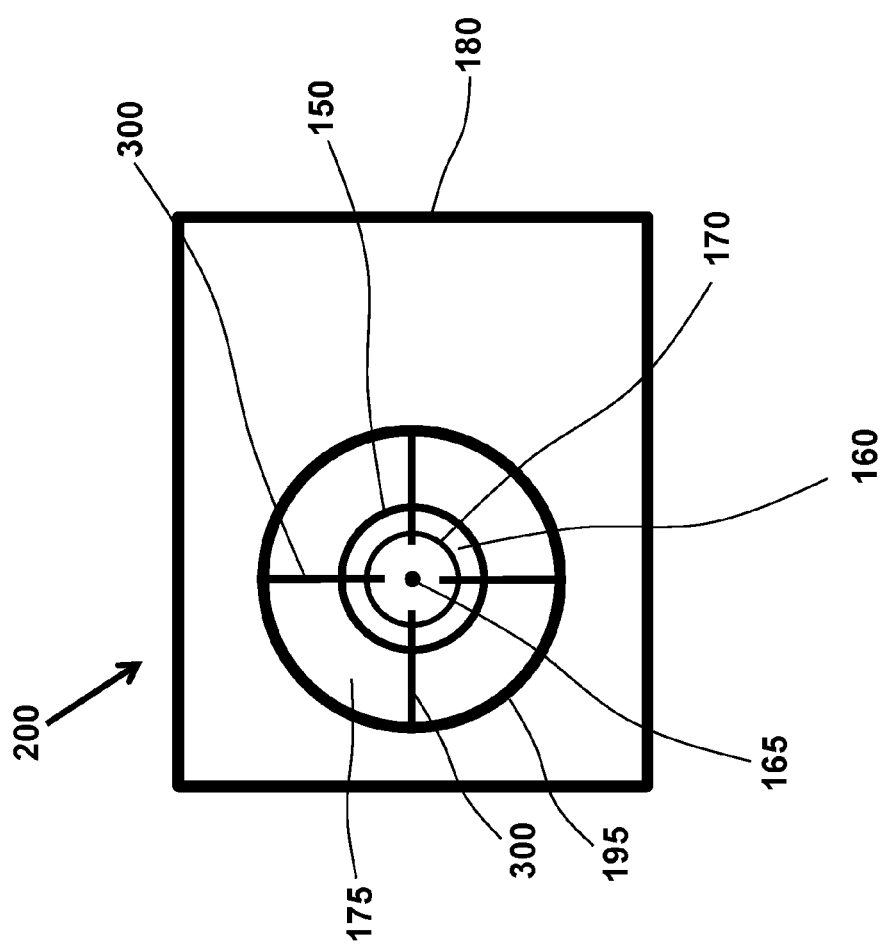
FIG. 1B is a drawing of the top view of the embodiment shown in FIG. 1A.

FIG. 1B is a drawing of the top view of the embodiment shown in FIG. 1A. In this drawing four field suppression probes 300 are shown attached electrically to the edge of the aperture region 195. Depending on the desired amount of field suppression one or more probes can be used. In this drawing the probes are extending slightly over the top of the vessel 170. Again, depending on the amount of field suppression desired, probes with different lengths and positions relative to the vessel can be used.

Figure 2A:
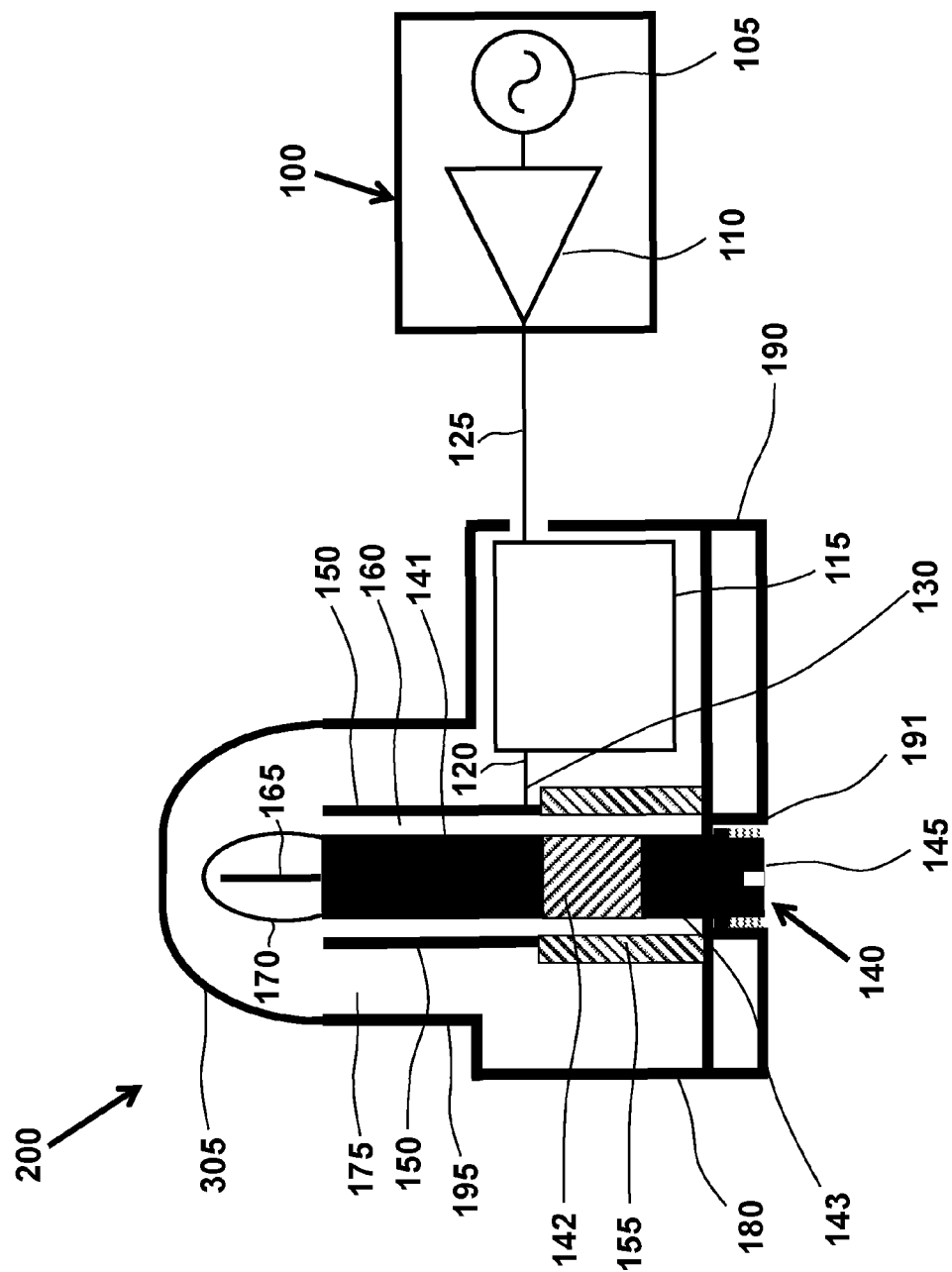
FIG. 2A is a drawing of another embodiment of this invention showing a different version of the field suppression probes integrated with the lamp housing that features a wave-launcher module.

FIG. 2A is a drawing of a lamp similar to the one in FIG. 1A but with a different embodiment of field suppression probes 305. In this embodiment the field suppression probes are electrically connected to the top edge of the aperture region 195 but it forms a continuous arch from one side of the aperture region to the other side and passes over the vessel 170. A complete arch suppresses the RF field more than the ones in FIG. 1A, but also blocks more light from the plasma arc. Choosing the right configuration (size, shape, and location) for the field suppression probes is a balance between the desired amount of field suppression and the acceptable amount of light blockage.

FIG. 2B is a drawing of the top view of the embodiment shown in FIG. 2A. In this drawing two field suppression probes 305 are shown attached electrically to the edge of the aperture region 195. These field suppression probes cross over the vessel 170 and block the light more than the field suppression probes in FIG. 1B but they provide more suppression of the radiated field from the top of the lamp housing and the vessel.

Figure 3A:
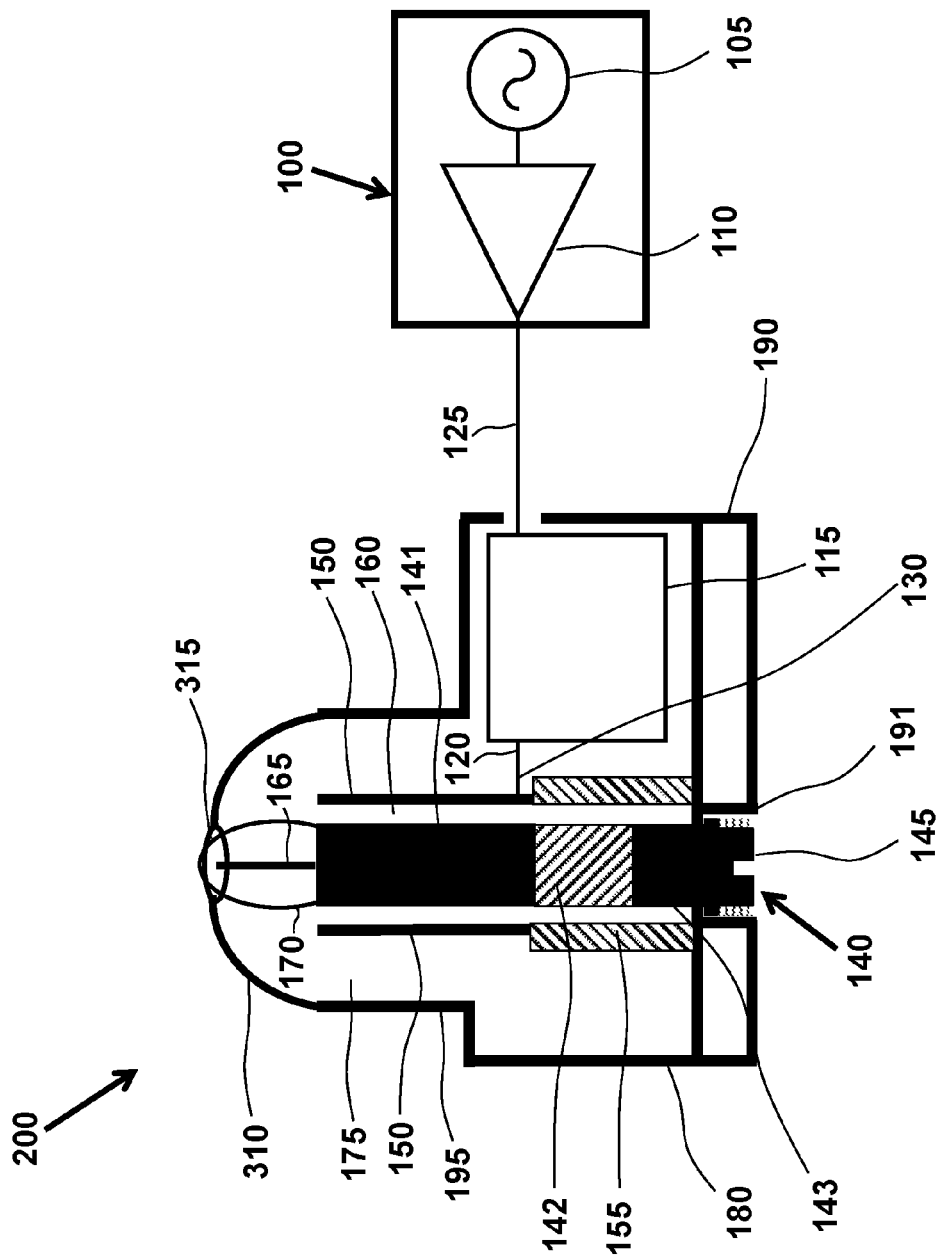
FIG. 3A is a drawing of another embodiment of this invention showing a different version of field suppression probes that also includes a circular probe that is integrated with the lamp housing that features a wave-launcher module.

FIG. 3A is a drawing of a lamp similar to the one in FIG. 1A but with a different embodiment of field suppression probes 310 and 315. In this embodiment the field suppression probes are electrically connected to the top edge of the aperture region 195 and include an electrically conductive field suppression ring 315 near the top of the vessel. This ring can be or not be in contact with the vessel and is connected to two or more field suppression probes 310 that electrically connect to the top edge of the aperture region 195 of the lamp housing 180. These field suppression probes suppress the radiated RF more than the ones in FIGS. 1A and 2A, however, they also block substantially more light from the plasma arc 165.

Figure 3B:
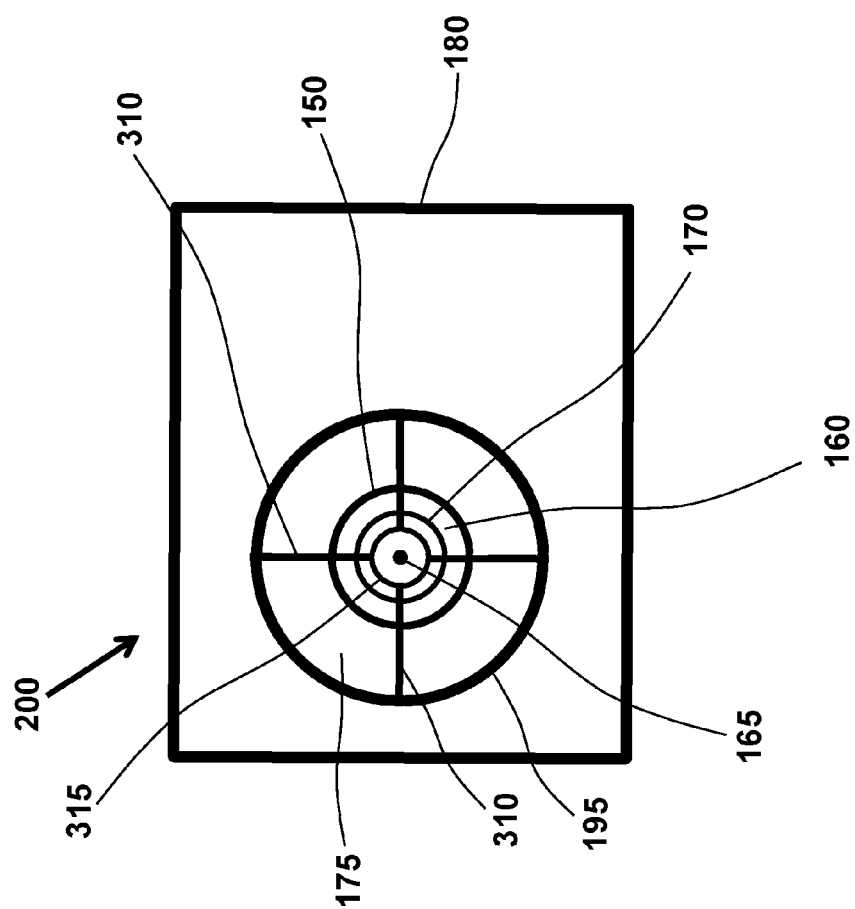
FIG. 3B is a drawing of the top view of the embodiment shown in FIG. 3A.

FIG. 3B is a drawing of the top view of the embodiment shown in FIG. 3A. In this drawing the field suppression ring 315 surrounding the top of the vessel 170 is shown. The filed suppression ring in this case is electrically connected by four field suppression probes 310 to the top edge of the lamp housing's 180 aperture region 195.

Figure 4A:
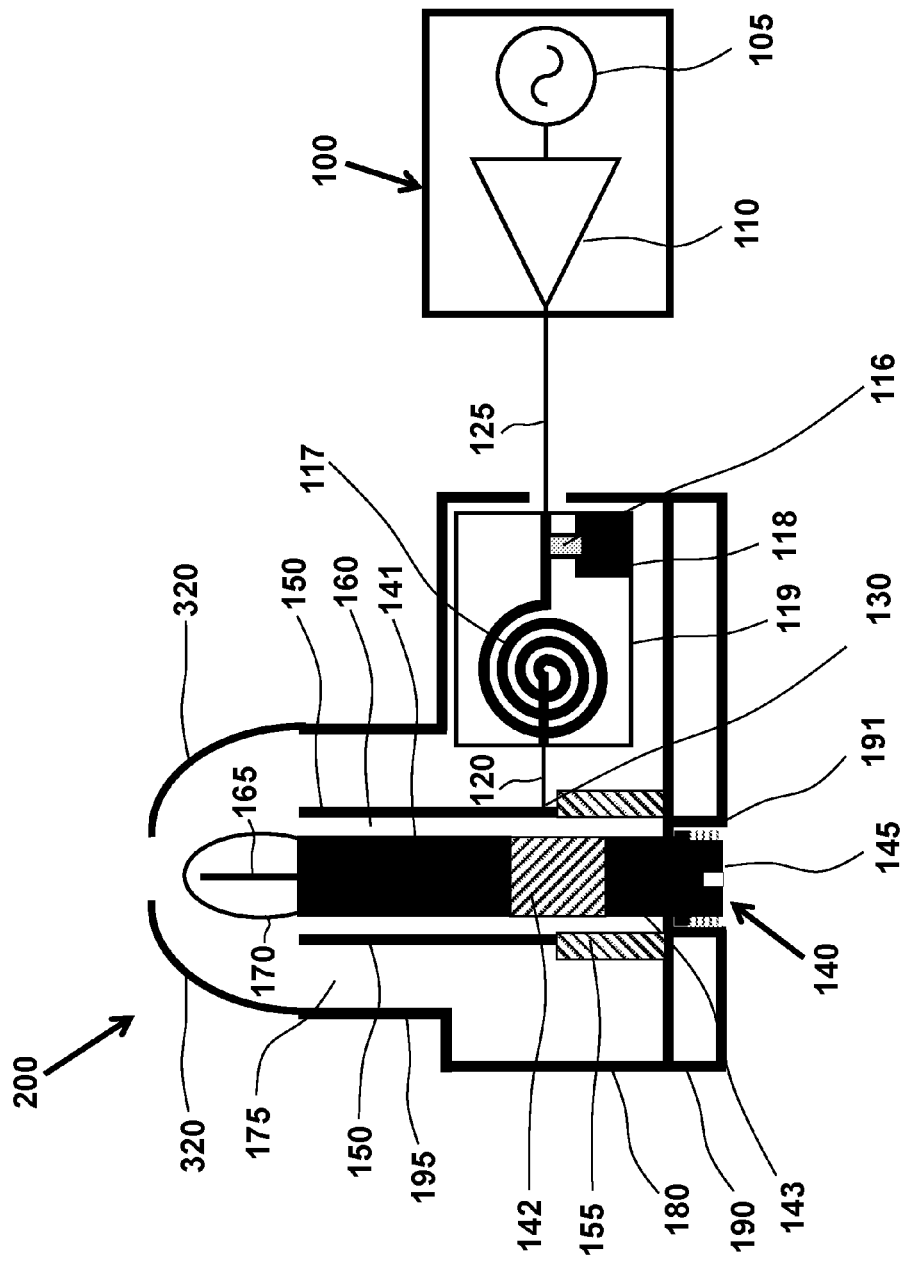
FIG. 4A is a drawing of field suppression probes similar to the one in FIG. 1A integrated with another embodiment of a lamp housing that features a wave-launcher module.

FIG. 4A is a drawing of field suppression probes similar to the embodiment shown in FIG. 1A but in this case the lamp housing 180 has a different wave-launcher 119 consisting of a circuit board with a spiral inductor 117 and surface mount capacitor(s) 116 with one side of the capacitor connected to the input of the inductor and the other side connected to ground 118.

Figure 4B:
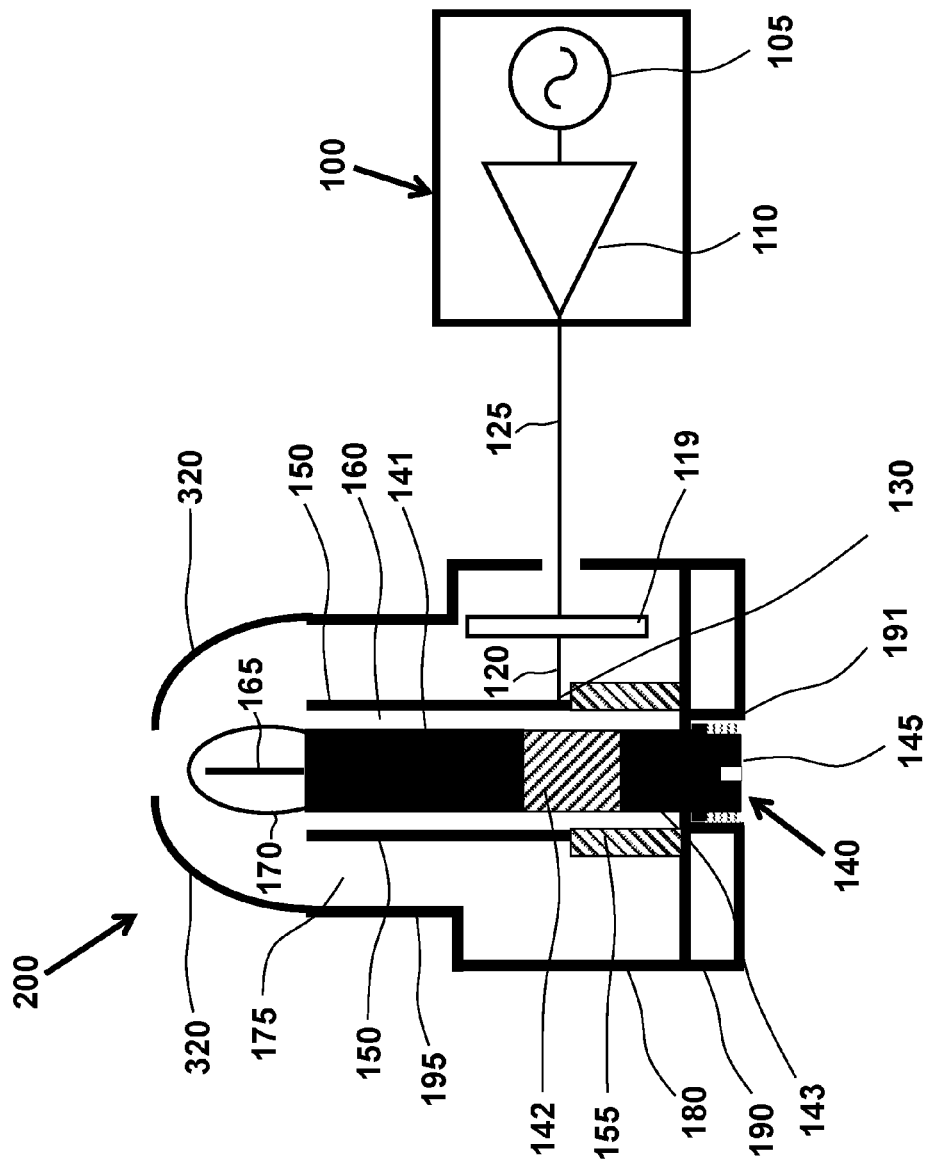
FIG. 4B is similar to the embodiment shown in FIG. 4A except the wave-launcher is oriented parallel to the bulb assembly.

FIG. 4B is a drawing of another embodiment of field suppression probes 320 integrated with a lamp module 180. In this embodiment the lamp module is similar to the embodiment in FIG. 4A except the wave-launcher 119 is oriented parallel to the vessel assembly 140 resulting in a square-shaped for the lamp housing.

Figure 4C:
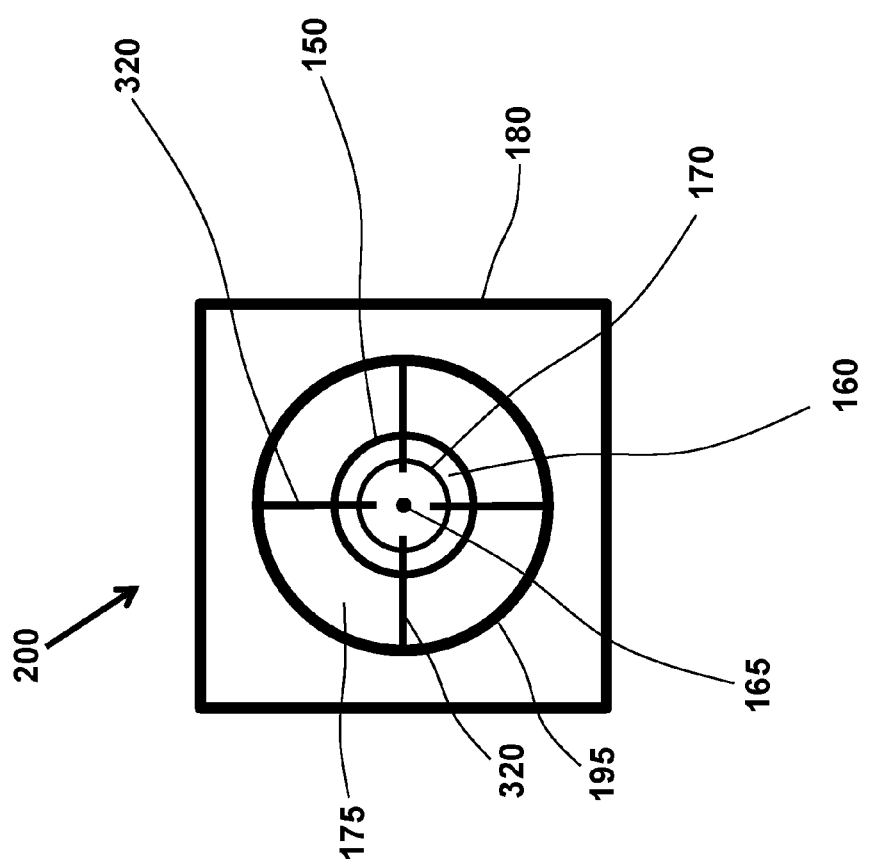
FIG. 4C is a drawing of the top view of the embodiment shown in FIG. 4B.

FIG. 4C is a drawing of the top view of the embodiment shown in FIG. 4B showing four field suppression probes 320 electrically connected to the edge of the aperture region 195 of the lamp housing 180. The top view shows that the lamp housing is square compared to the lamp housing in FIG. 1B that was a rectangle. The dimensions and shape of the lamp housing have very little effect on the overall operation of the lamp.

Figure 5A:
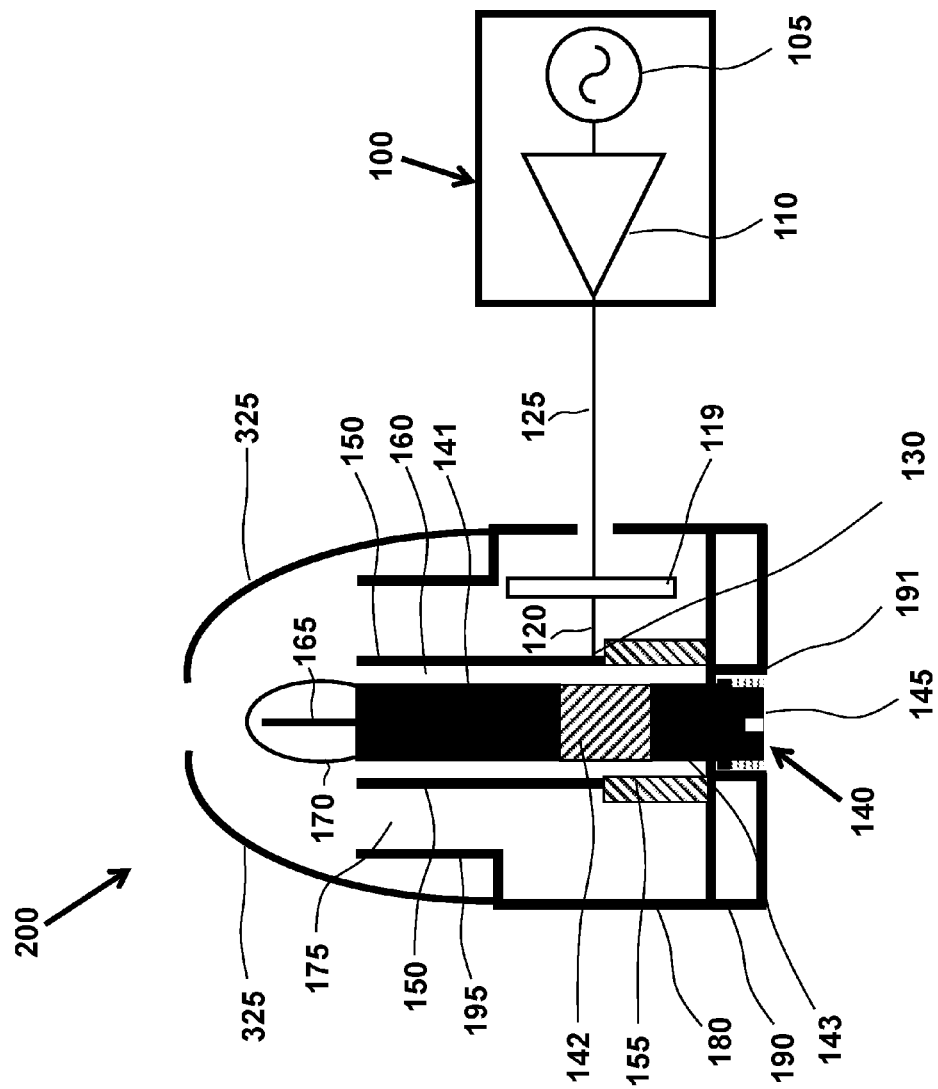
FIG. 5A is similar to the embodiment shown in FIG. 4B except the field suppression probes are attached to the top surface of the lamp housing.

FIG. 5A is a drawing of another embodiment of field suppression probes 325 integrated with the lamp housing 180. This embodiment is similar to the embodiment in FIG. 4B except that the field suppression probes are electrically connected to the top surface of the lamp housing 180 instead to top of the aperture region 195. The field suppression probes extend above the vessel 170.

Figure 5B:
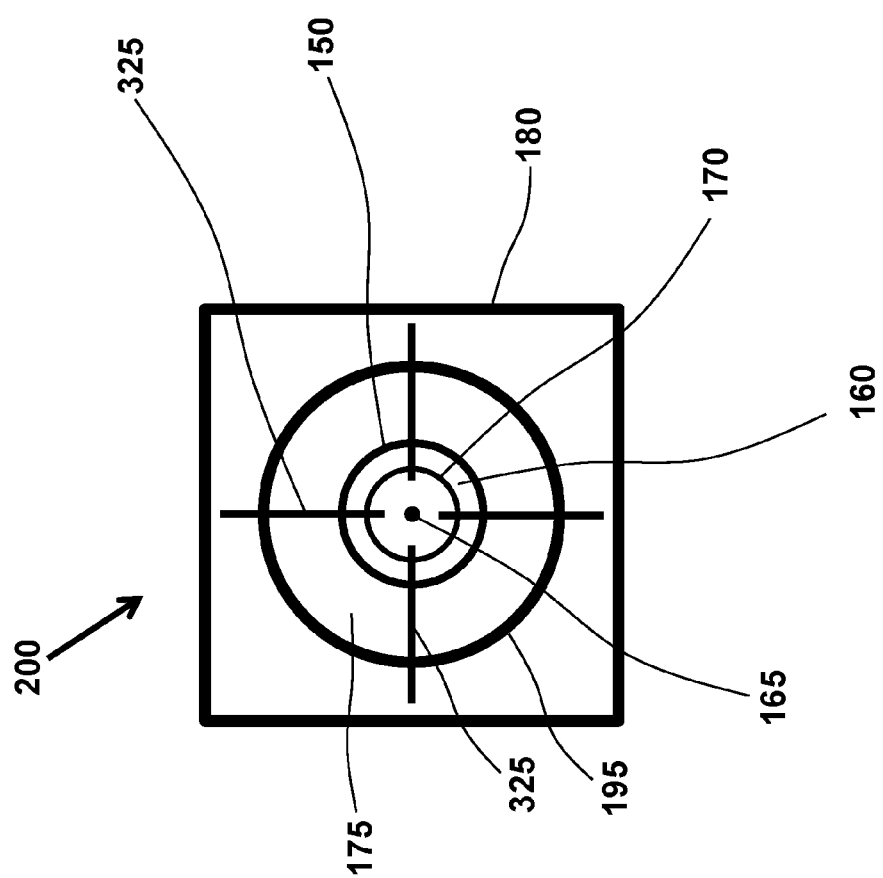
FIG. 5B is a drawing of the top view of the embodiment shown in FIG. 5A.

FIG. 5B is a drawing of the top view of the embodiment shown in FIG. 5A showing four field suppression probes 325 electrically connected to the top of the lamp housing 180 instead of the top of the aperture region 195 and extend over the vessel 170.

Figure 6:
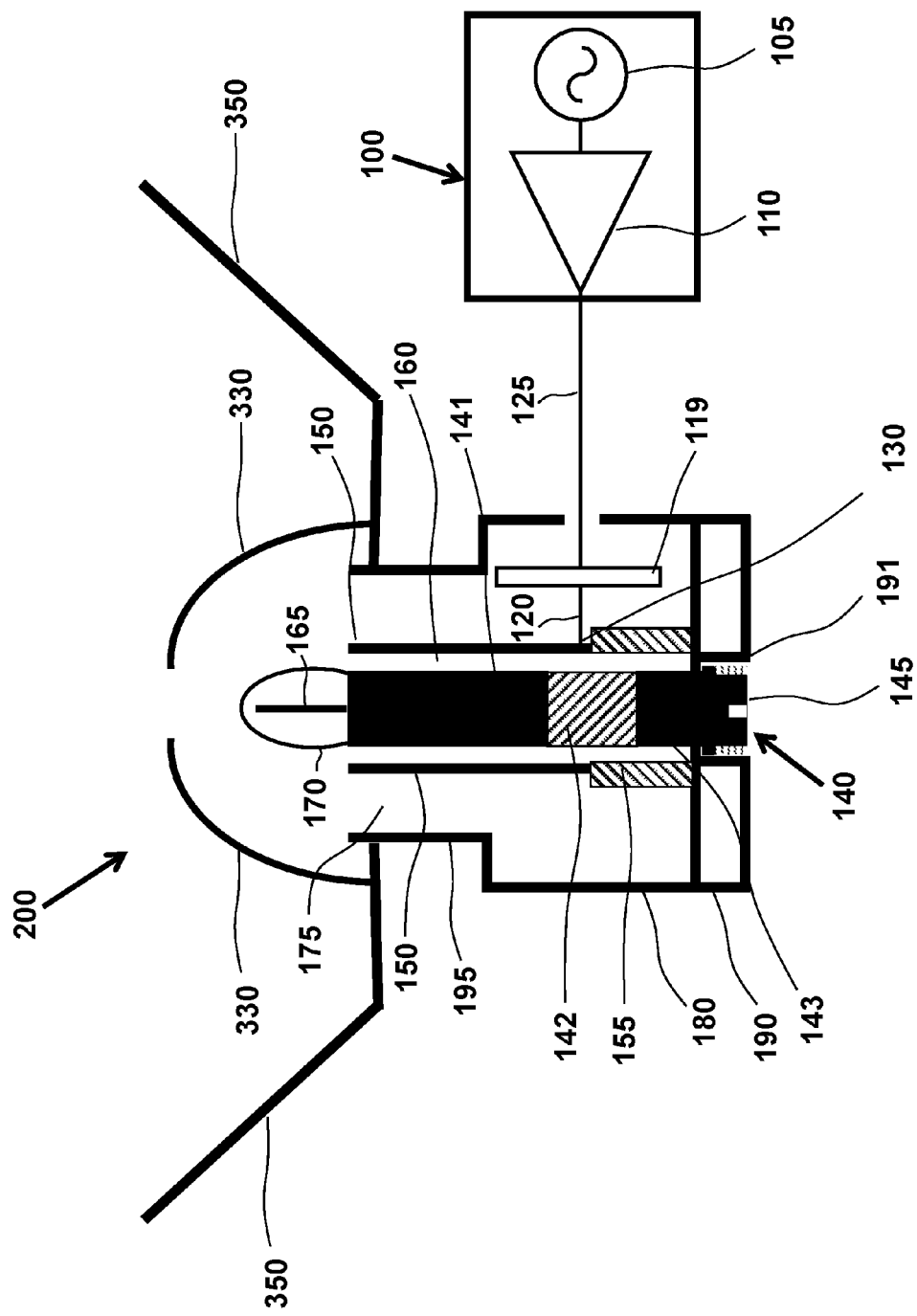
FIG. 6 is an embodiment that is similar to FIG. 5A, except that the field suppression probes are attached to a fixture structure that is attached to the lamp housing.

FIG. 6 is a drawing of another embodiment of field suppression probes 330 integrated with a secondary structure 350 that is electrically connected to the aperture region 175 on the aperture region 195. In this case, the secondary structure is a metallic reflector. The secondary structure can be, but not limited to, reflector, fixture, mounting structure, EMI box, etc. The probes are configured near the vessel 170 very similar to FIG. 5A.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrodeless high intensity discharge lamp comprising:
    a housing comprising spatial volume surrounded by an exterior region;
    an aperture region formed on a portion of the exterior region to expose the spatial volume;
    an interior wall comprising a conductive material formed within the aperture region and coupled to the aperture region;
    an upper surface region configured overlying the interior wall region to form a border of the aperture region;
    a conductive internal housing member shaped as a cylindrical sleeve member, and having a first end and a second end and a length defined between the first end and the second end, the cylindrical sleeve member configured to be normal to a direction the upper surface region, and in parallel to a direction of the interior wall such that the first end of the cylindrical sleeve is inserted intimately within the interior wall region to extend from the spatial volume to a plane region parallel to the surface region and such that the conductive internal housing member is electrically isolated from the interior wall of the housing;
    a spatial gap region formed between the interior wall and an external region of the conductive internal housing member to form the electrical isolation between the interior wall of the housing and the conductive internal housing member;
    a constant width characterizing an annular region included in the spatial gap region, the annular region having an outer circumference and an inner circumference having a spacing defined by the constant width from a zero point to the zero point through a 360 degree rotation;
    a vessel made from a light transmitting material, the vessel comprising any combination of a gas, a solid, and a liquid contained within an interior volume of the vessel, the vessel comprising a mechanical support region combining to constitute a vessel assembly, and the mechanical support region positioning the vessel within a center portion of the aperture region;
    a wave-launcher module comprising an RF input for inputting a first RF signal having a first frequency range and a first voltage range, and an RF output for a second RF signal having the first frequency range and a second voltage range, and configured to output the second RF signal to the spatial gap region using the conductive internal housing cause electromagnetic radiation to be emitted from the vessel; and
    a field-suppression probe spatially disposed within a vicinity of the vessel and within a vicinity of the aperture region to cause a portion of an RF electromagnetic field to remain within the region of the vessel while emitting the electromagnetic radiation in a form of light from the vessel, such that the RF electromagnetic field remains in the vicinity of the aperture region and prevents RF electromagnetic interference ("EMI") of nearby wireless and electronic devices.

2. The lamp of claim 1 wherein the field-suppression probe comprises a conducting material.

3. The lamp of claim 1 wherein the field-suppression probe comprises a metal material.

4. The lamp of claim 1 wherein the field suppression probe comprises a plurality of probes.

5. The lamp of claim 1 wherein the field suppression probe is electrically coupled to the housing or directly connected to the housing.

6. The lamp of claim 1 wherein the field suppression probe has a first end and a second end.

7. The lamp of claim 1 wherein one ends or both ends of the field suppression probe is electrically coupled or directly connected to the housing.

8. The lamp of claim 1 wherein the field suppression probe has a plurality of endings.

9. The lamp of claim 1 wherein the field suppression probe has one or more endings electrically coupled or directly connected to the housing.

10. The lamp of claim 1 wherein the field suppression probe comprises a plurality of conductive sheets.

11. The lamp of claim 1 wherein the field suppression probe comprises a plurality of probes that are configured curved, fin-shaped, triangular, or similar thereof.

12. The lamp of claim 1 wherein the field suppression probe comprises a plurality of probes configured mechanically to surround the vessel.

13. The lamp of claim 1 wherein the field suppression probe comprises a plurality of probes configured mechanically to create a ring around the vessel.

14. The lamp of claim 1 wherein the field suppression probe comprising a plurality of probes formed to create a mesh-like structure around the vessel and within a vicinity of the aperture region.

15. A lamp apparatus, comprising:
    a housing comprising spatial volume surrounded by an exterior region;
    an aperture region formed on a portion of the exterior region to expose the spatial volume;
    an interior wall comprising a conductive material formed within the aperture region and coupled to the aperture region;
    an upper surface region configured overlying the interior wall region to form a border of the aperture region;
    a conductive internal housing member shaped as a cylindrical sleeve member, and having a first end and a second end and a length defined between the first end and the second end, the cylindrical sleeve member configured to be normal to a direction the upper surface region, and in parallel to a direction of the interior wall such that the first end of the cylindrical sleeve is inserted intimately within the interior wall region to extend from the spatial volume to a plane region parallel to the surface region and such that the conductive internal housing member is electrically isolated from the interior wall of the housing;

a spatial gap region formed between the interior wall and an external region of the conductive internal housing member to form the electrical isolation between the interior wall of the housing and the conductive internal housing member;

a constant width characterizing an annular region included in the spatial gap region, the annular region having an outer circumference and an inner circumference having a spacing defined by the constant width from a zero point to the zero point through a 360 degree rotation;

a vessel made from a light transmitting material, the vessel comprising any combination of a gas, a solid, and a liquid contained within an interior volume of the vessel, the vessel comprising a mechanical support region combining to constitute a vessel assembly, and the mechanical support region positioning the vessel within a center portion of the aperture region;

a wave-launcher module comprising an RF input for inputting a first RF signal having a first frequency range and a first voltage range, and an RF output for a second RF signal having the first frequency range and a second voltage range, and configured to output the second RF signal to the spatial gap region using the conductive internal housing cause electromagnetic radiation to be emitted from the vessel; and a field-suppression probe spatially disposed within a vicinity of the vessel and within a vicinity of the aperture region to cause a portion of an RF electromagnetic field to remain within the region of the vessel while emitting the electromagnetic radiation in a form of light from the vessel, such that the RF electromagnetic field remains within the vicinity of the aperture region and prevents RF electromagnetic interference ("EMI") of nearby wireless and electronic devices.

16. The apparatus of claim 15 wherein the lamp is integrated with a lamp fixture.

17. The apparatus of claim 15 wherein the field suppression probe comprises a plurality of probes that have at least one end conductively attached to the apparatus.

18. The apparatus of claim 15 wherein the field suppression probe comprises a plurality of probes that have two or more ends conductively attached to the apparatus.

19. The apparatus of claim 15 wherein the field suppression probe comprises a plurality of probes that are configured to surround the vessel without physically contacting the vessel.

20. The apparatus of claim 15 wherein the field suppression probe comprises a plurality of probes that are configured to create a ring around the vessel.

21. The apparatus of claim 15 wherein the field suppression probe comprises a plurality of problems that are configured to create a loop around the vessel.

22. An electrodeless high intensity discharge lamp comprising:
an electrically conductive lamp module or housing having a spatial volume within the housing containing one or more openings;
a bulb assembly, comprising of one or more sections of conductive and non-conductive materials and a gas-filled vessel (bulb) that has a combination of gas and metal halides contained within, attached to and contained within the lamp module or housing;
an RF driver comprising of an RF source and amplifier;
an input coupling element with one end electrically grounded to the lamp module; an extended output coupling element with one end externally extended outside of the lamp module and the other end attached and electrically grounded to the lamp module and field-suppression probes situated in the vicinity of the bulb.

23. The lamp of claim 22 wherein the field-suppression probe comprises a plurality of probes that are made of a conducting material.

24. The lamp of claim 22 wherein the field-suppression probe comprises a plurality of probes that are made of a metal.

25. The lamp of claim 22 wherein the field suppression probe has at least one end conductively attached to the lamp module or housing.

26. The lamp of claim 22 wherein the field suppression probe has two or more ends conductively attached to the lamp module or housing.

27. The lamp of claim 22 wherein the field suppression probe is made of conductive wire.

28. The lamp of claim 22 wherein the field suppression probe is made of a plurality of conductive sheets.

29. The lamp of claim 22 wherein the field suppression probe comprises a plurality of probes that are curved, fin-shaped, triangular, or similar thereof.

30. The lamp of claim 22 wherein the field suppression probe comprises a plurality of probes that are configured to surround the vessel.

31. The lamp of claim 22 wherein the field suppression probe comprises a plurality of probes that are configured to create a ring around the vessel.

32. The lamp of claim 22 where the field suppression probe comprises a plurality of probes that create a mesh-like structure around the bulb and the lamp module.

* * * * *